US011550851B1

(12) United States Patent
Kabzan et al.

(10) Patent No.: US 11,550,851 B1
(45) Date of Patent: Jan. 10, 2023

(54) VEHICLE SCENARIO MINING FOR MACHINE LEARNING MODELS

(71) Applicant: Motional AD LLC, Boston, MA (US)

(72) Inventors: Juraj Kabzan, Boston, MA (US); Julia Gomes, San Francisco, CA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/669,186

(22) Filed: Feb. 10, 2022

(51) Int. Cl.
*G06F 16/903* (2019.01)
*G05B 13/02* (2006.01)
*B60W 60/00* (2020.01)

(52) U.S. Cl.
CPC ... *G06F 16/90344* (2019.01); *G05B 13/0265* (2013.01); *B60W 60/001* (2020.02); *B60W 2554/40* (2020.02)

(58) Field of Classification Search
USPC ....................................................... 707/772
See application file for complete search history.

(56) References Cited

U.S. PATENT DOCUMENTS

2019/0197778 A1\* 6/2019 Sachdeva ................ G06T 15/30

\* cited by examiner

*Primary Examiner* — Tyler D Paige
(74) *Attorney, Agent, or Firm* — Mintz, Levin, Cohn, Ferris, Glovsky and Popeo, P.C.

(57) ABSTRACT

Provided are methods for vehicle scenario mining for machine learning methods, which can include determining a set of attributes associated with an untested scenario for which a machine learning model of an autonomous vehicle is to make planned movements. The method includes searching a scenario database for the untested scenario based on the set of attributes. The scenario database includes a plurality of datasets representative of data received from an autonomous vehicle sensor system in which the plurality of datasets is marked with at least one attribute of the set of attributes. The method further includes obtaining the untested scenario from the scenario database for inputting into the machine learning model for training the machine learning model. The machine learning model is configured to make the planned movements for the autonomous vehicle. Systems and computer program products are also provided.

30 Claims, 12 Drawing Sheets

VEHICLE SCENARIO MINING FOR MACHINE LEARNING MODELS

BACKGROUND

An autonomous vehicle is a vehicle that is capable of sensing its environment and navigating without human input. Autonomous vehicles rely on multiple types of sensors to perceive the surrounding environment. The sensors provide the autonomous vehicle with data representative of the surrounding environment. The autonomous vehicle performs various processing techniques on the data to make safe and correct movement decisions. These decisions safely navigate the autonomous vehicle to choose a path to avoid obstacles and react to a variety of different driving scenarios, such as the abrupt movements of proximate vehicles.

Testing all conditions and scenarios that an autonomous vehicle must navigate is generally dangerous and unfeasible in real-world driving environments. Moreover, conventional simulators typically do not test a variety of different driving scenarios and fail to identify or test movement decisions of the autonomous vehicle in rare or edge-case scenarios.

DETAILED DESCRIPTION

Figure 1:
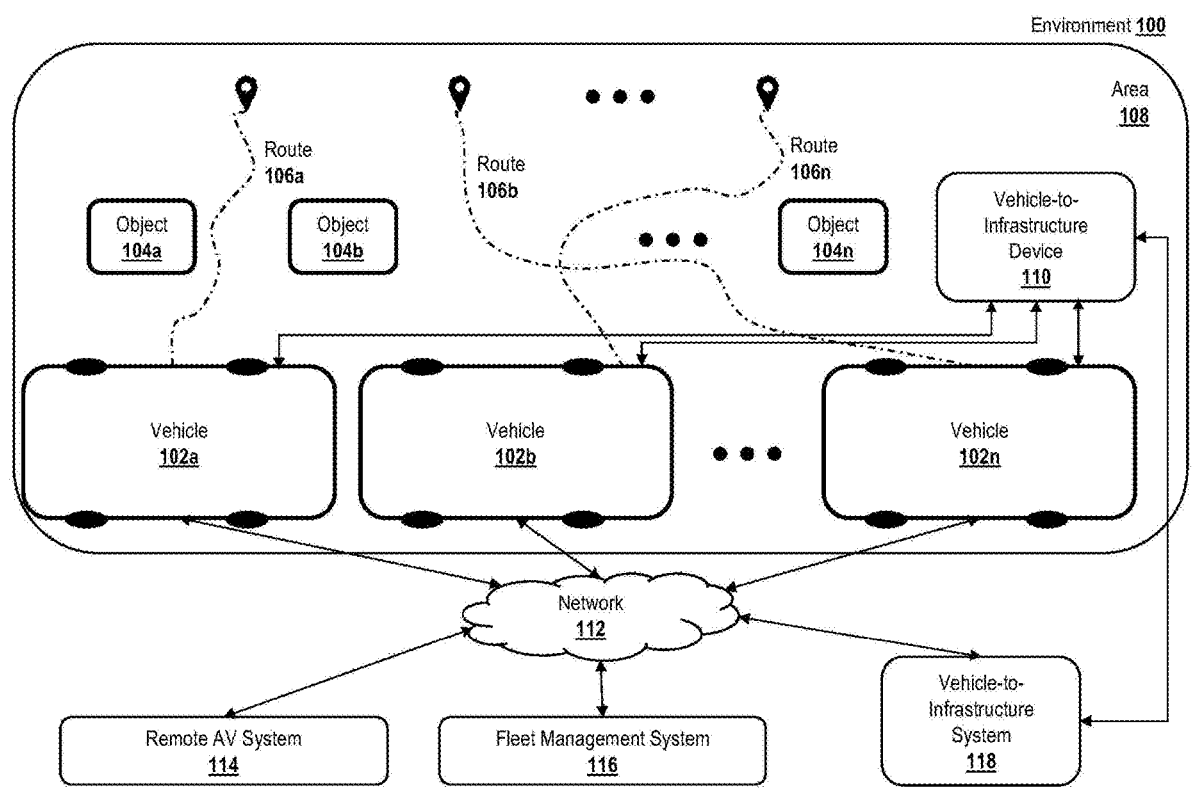
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement vehicle scenario mining for machine learning models. A scenario mining system can identify uncommon scenarios potentially encountered by a vehicle (such as an autonomous vehicle). Scenario mining is a technique in which driving scenarios are identified from a database of driving scenarios to further train a machine learning model of a vehicle. For example, the driving scenarios that are rarely encountered by the vehicle may be mined to further train the machine learning model to safely respond to these uncommon driving scenarios. Scenario mining is carried out by searching a scenario database based on a set of attributes to identify the driving scenario of interest.

Further, scenario mining is performed for the machine learning model in order to assess how the vehicle's systems would respond to rare and edge-case scenarios. As an example technique, a scenario mining system determines a set of attributes associated with an untested scenario for which a machine learning model of a vehicle is to make planned movements. The untested scenario may be indicative of a scenario in which the planned movements of the machine learning model are uncertain. For example, an untested scenario for the machine learning model can include attributes such as responding to a pedestrian with a stroller in a crosswalk in a construction zone. A scenario database is searched to identify untested scenarios based on the set of attributes. The scenario database includes a plurality of datasets representative of data received from the vehicle's sensor system in which the plurality of datasets is marked with at least one attribute from the set of attributes. The untested scenario from the scenario database is then obtained for inputting into the machine learning model for training the machine learning model on the edge-case scenario. This technique identifies untested scenarios to determine how the vehicle's systems would handle such scenarios in the real world.

By virtue of the implementation of systems, methods, and computer program products described herein, techniques for vehicle scenario mining for machine learning models. Unlike other methods for training machine learning models, the scenario mining framework described herein includes techniques for mining scenarios from a scenario database. The scenario database includes a plurality of datasets marked with at least one attribute of the set of attributes to facilitate scenario mining. Without the ability to mine the scenario database, brute force training and experimentation would be the costly and inefficient alternative for the creation of safe and comprehensive autonomous vehicle machine learning models. Brute force testing requires every possible scenario to be inputted to the machine learning model. Not only is this inefficient and costly, but it fails to adapt and predict new untested scenarios that drivers and autonomous vehicles encounter alike. Further, brute force search testing is insufficient as the number of potential edge case and untested scenarios constantly increase and change over time. As a technical improvement, the scenario database described herein mines complex scenarios using SQL queries using attributes of these complex scenarios.

Further, the scenario database and attribute marking system solves technical problems associated with training a machine learning model configured to make planned movements for an autonomous vehicle. Technical problems include obtaining evaluation metrics for untested scenarios to ensure autonomous vehicles are safe for rare and edge case scenarios. For example, a machine learning model trained in a variety of city scenarios may behave poorly or even dangerously when a land mammal is detected on a country road. Without identifying untested scenarios and their associated metrics, it may be unclear the extent of the effect that any one of these uncommon scenarios would have on the autonomous vehicle's ability to continue navigation.

Other technical problems include a lack of a data model showing that the machine learning model is properly trained for uncommon and untested scenarios beyond the natural distribution of driving scenarios. For example, manual scenario mining may be overly concerned by the effects of large trucks on the planned movements of the machine learning model. But the underdeveloped area of the machine learning model may be the planned movements in response to bicyclists at four-way stops. Where a human operator would overlook this edge case scenario, the scenario mining framework described herein takes a data-driven approach to ensure that the machine learning model is trained for the most uncommon and untested scenarios. Without this data-driven approach, it is unclear whether the machine learning model can make safe planned movements for the autonomous vehicle. As such, there is a need for a system to determine a set of attributes associated with an untested scenario for searching and obtaining an untested scenario at a scenario database.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
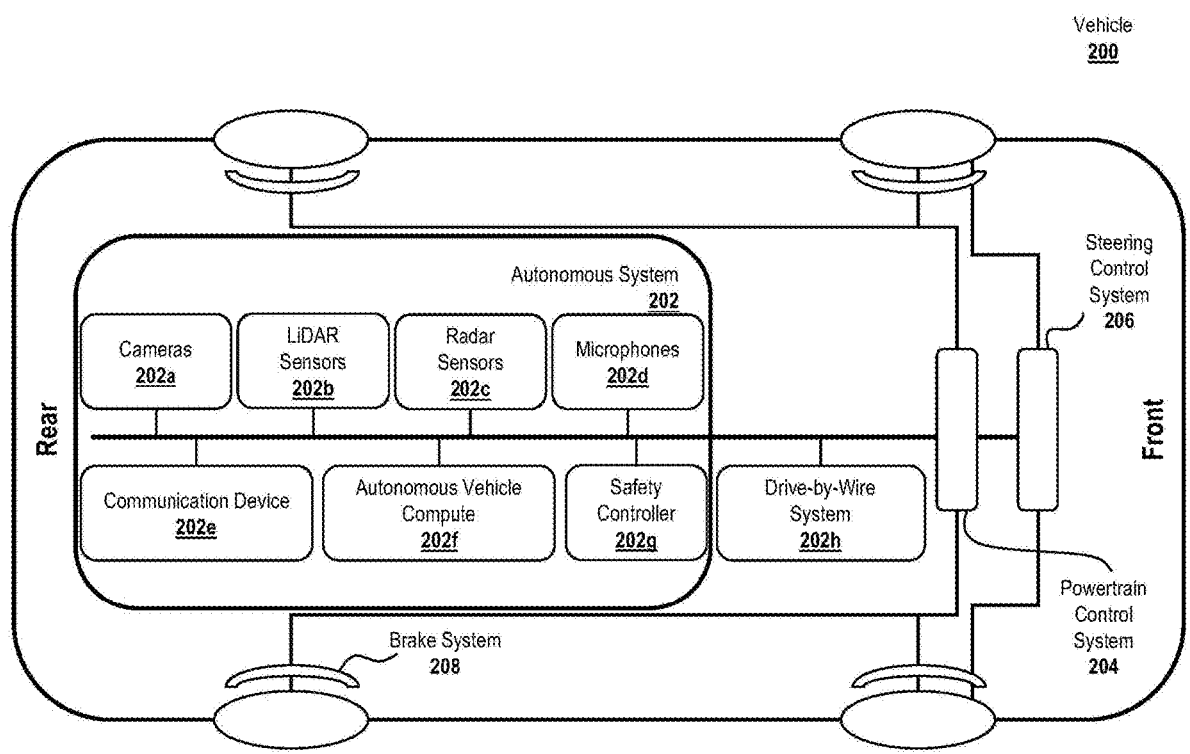
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
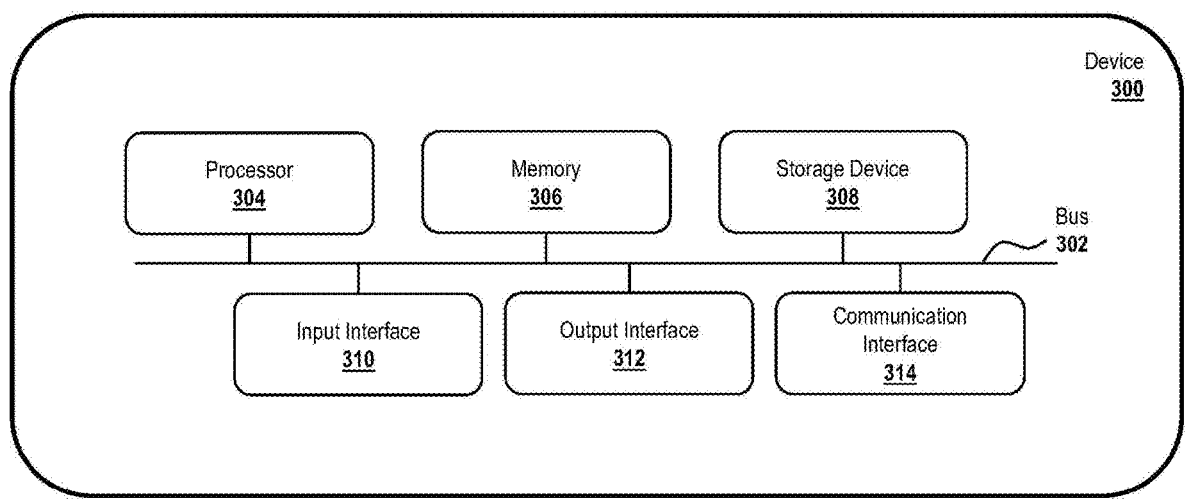
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
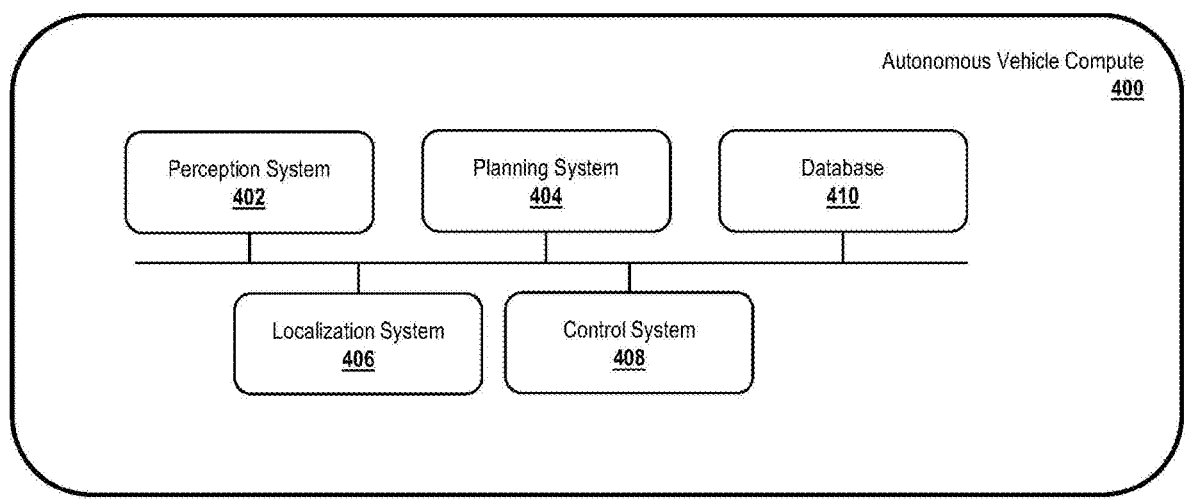
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
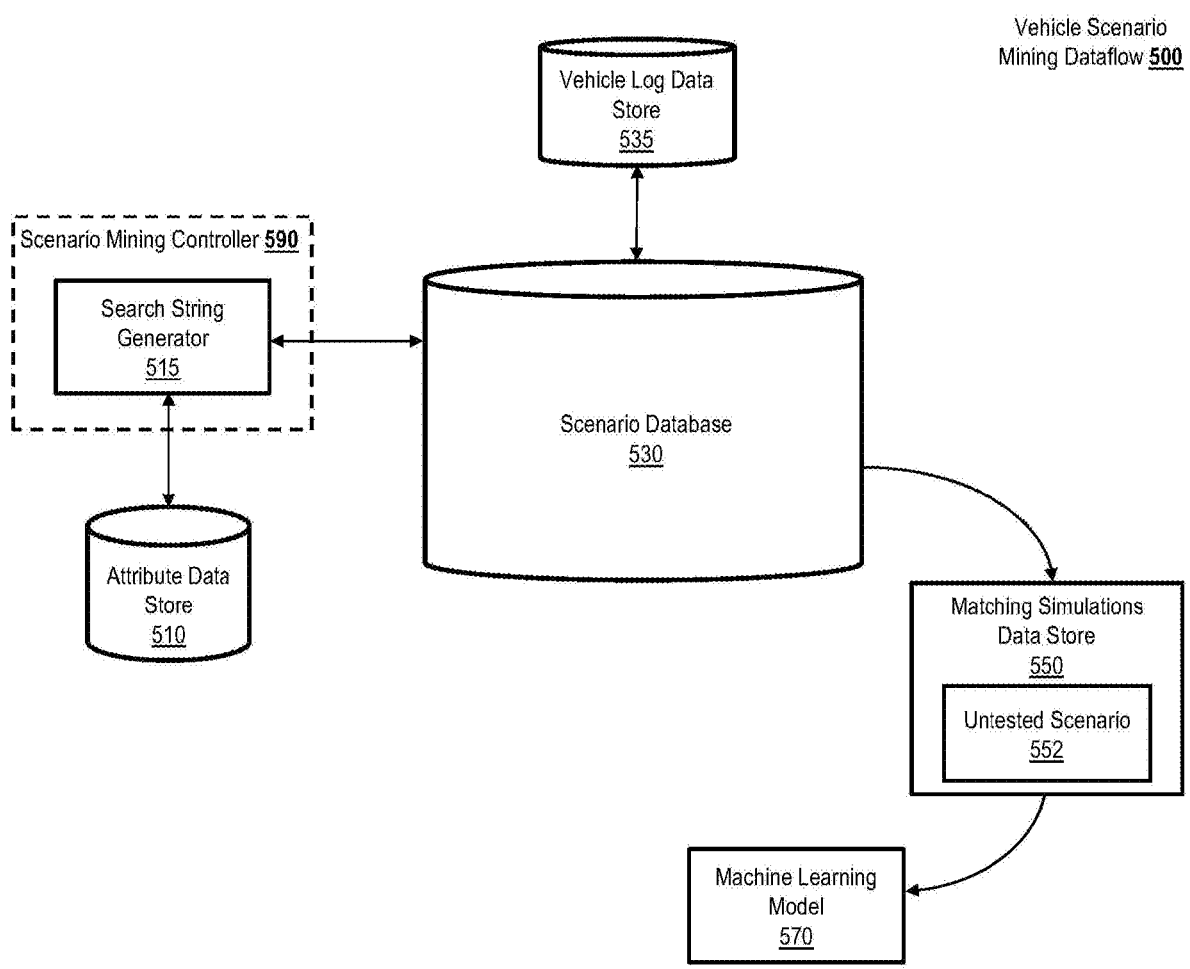
FIG. 5 is a diagram of an implementation of a vehicle scenario mining framework for querying a scenario database to obtain an untested scenario.

Referring now to FIG. 5, illustrated is a diagram of an implementation of a vehicle scenario mining framework for querying a scenario database 530 to obtain an untested scenario 552. The search string generator 515 may be configured to generate a search string for the scenario database 530 based on a set of attributes from the attribute data store 510. The search string generator 515 may be configured to present a search string to the scenario database 530. The scenario database 530 may include various vehicle scenarios and receive additional vehicle scenarios from a vehicle log data store 535. The scenario database 530 may return a set of matching simulations to the simulations data store 550 that includes an untested scenario 552. The untested scenario 552 may be indicative of a scenario in which the planned movements of the machine learning model are uncertain. The matching scenarios, including the untested scenario 552, may be inputted to the machine learning model 570 at an end of the vehicle scenario mining dataflow 500. The machine learning model 570 may be further trained on the untested scenario 552 and configured to make updated planned movements for an autonomous vehicle. The machine learning model 570 can be implemented by perception system 402, planning system 404, localization system 406, and/or control system 408.

The attribute data store 510 may include a set of attributes for identifying an untested scenario 552 in the scenario database 530. The attribute data store 510 may be configured to store attributes related to driving in a vehicle environment. The attribute data store 510 may include conditions and features that are characteristic of environments that a vehicle may encounter. Conditions and features may be combined to create vehicle scenarios for further training the machine learning model 570. For example, the "snow" attribute is a condition combined with a "driving between two 18 wheeler trucks" attribute to create a vehicle scenario. In another example, the vehicle scenario includes combining a condition that the ego vehicle has a broken sensor with the feature of the vehicle coasting down a steep hill.

The attribute data store 510 may be configured to pass a set of attributes to a search string generator 515. In some embodiments, the attributes in the attribute data store 510 may be selected to obtain untested, rare, or edge-case vehicle scenarios. The untested, rare, or edge-case vehicle scenarios may be desirable to identify to further train the machine learning model 570 and improve the robustness of the machine learning model 570. For example, a desired vehicle scenario that may remain untested by the machine learning model 570 includes an ego vehicle that is driving proximate to a large truck as the ego vehicle and the large truck approach a crosswalk with a pedestrian and a stroller. To capture vehicle scenarios similar to this desired scenario, the attributes selected from the attribute data store 510 may include an agent vehicle that is a large truck, a pedestrian detected in the crosswalk, a stroller detected in the crosswalk, and the ego vehicle is 30 feet away from the crosswalk. In another example, a desired vehicle scenario untested by the machine learning model 570 includes an ego vehicle having an encounter with large animals on country roads at night time. To obtain this desired scenario, the query may include attributes for a desired scenario that includes a night attribute, a single-lane highway attribute, and an animal attribute.

In some embodiments, an untested, rare, or edge-case vehicle scenario may be determined based on the scenarios that were previously used to train the machine learning model 570. That is, heavily tested attributes may be absent from untested vehicle scenarios. Rather, attributes to which the machine learning model 570 has little exposure may be selected as the attributes for untested, rare, or edge-case vehicle scenarios. For example, the scenario mining controller 590 determines the attribute to be selected based on its relatively low frequency of testing in previous training scenarios. In another example, the scenario mining controller 590 selects an attribute based on the attribute having a difficulty rating satisfying a difficulty threshold. In some embodiments, the set of attributes may be determined by the scenario mining controller 590 or may be hand-selected to obtain specific edge-case vehicle scenarios.

The search string generator 515 may generate a query for the scenario database 530 to identify the rare or untested scenario 552. The search string generator 515 may be configured to generate a search string based on the attributes. The search string generator 515 may be configured to receive a set of attributes as input and generate a search string configured to query the scenario database 530 as output. For example, the search string generator 515 formats search strings (e.g., generate Boolean logic, add qualifiers and variables to a function call) and obtain proper syntax for search strings (e.g., identify variables representative of the attribute) to form a search string that is configured to perform a query at the scenario database 530 based on the attributes. In some embodiments, the search string generator 515 may generate the search string in response to determining the set of attributes associated with the untested scenario 552. In some embodiments, the search string generator 515 may generate an SQL query.

The scenario database 530 may be configured to receive a set of attributes as input and be configured to return a vehicle scenario based on the set of attributes as output. That is, the scenario database 530 may be configured to mine vehicle scenarios based on the set of attributes. To facilitate the vehicle scenario mining, the plurality of vehicle scenarios may include metadata for matching attributes from the search string to the vehicle scenario. For example, the scenario database 530 receives the following attributes: a large truck that is an agent vehicle, a pedestrian detected in the crosswalk, a stroller detected in the crosswalk, and the ego vehicle located 30 feet away from the crosswalk. The scenario mining controller 590 may search through the scenario database 530 to identify a vehicle scenario having metadata that includes a large truck as an agent vehicle, a pedestrian detected in the crosswalk, a stroller detected in the crosswalk, and the ego vehicle located 30 feet away from the crosswalk. In another example, the scenario mining controller 590 searches through the scenario database 530 to identify the vehicle scenario having metadata that includes nighttime conditions, single-lane highways, and objects having facial features and four-legs.

The scenario database 530 may include a plurality of vehicle scenarios in which each vehicle scenario includes a vehicle sensor data associated with one or more timeframes. The plurality of vehicle scenarios may be obtained from a vehicle log data store 535, a simulator, or a combination thereof. For example, a vehicle scenario is based on an actual driving environment and sensor data but may include artificially inserted walls or obstacles. A vehicle scenario may include a plurality of datasets representative of data received from an autonomous vehicle sensor system including a LIDAR sensor dataset, camera sensor dataset, RADAR sensor dataset, telemetrics sensor dataset, and other ego vehicle sensor datasets. In some embodiments, the scenario database 530 may include the presence of a sensor in the metadata or a value of the sensor in the metadata. The scenario mining controller 590 may be configured to search for the presence and a threshold value of a sensor based on an attribute associated with the sensor. In some embodiments, the scenario database 530 may comprise an SQL database and the scenario database 530 may be configured to carry out the SQL query.

The vehicle log data store 535 may include data logged by an autonomous vehicle. The logged data may include data that has not yet been tagged with metadata and uploaded to the scenario database 530. The scenario database 530 may be updated by the vehicle log data store 535 with new scenarios. The scenario mining controller 590 may be configured to add metadata to vehicle scenarios from the vehicle log data store 535 to update the scenario database 530 based on new environments the vehicle has been in or simulations in which the machine learning model 570 has been trained. The data in the vehicle log data store 535 may include data from the autonomous vehicle sensor system that is representative of an environment surrounding the autonomous vehicle.

The matching simulations data store 550 may include a subset of the plurality of vehicle scenarios having metadata matching the set of attributes received by the scenario database 530. The subset of the plurality of vehicle scenarios may include the untested scenario 552. The untested scenario 552 may be a scenario in which the planning movements of the machine learning model 570 have not satisfied a test frequency threshold. For example, the test frequency threshold includes a quantitative threshold representative of a number of vehicle scenarios having the attribute used to train the machine learning model 570. The untested scenario 552 may be a scenario in which the planning movements of the machine learning model 570 are uncertain. For example, the uncertain planning movements arise if multiple planning movements can be made that may be safer or more efficient than an alternative planning movement. The untested scenario 552 may be a scenario in which the planning movements of the machine learning model 570 satisfies a difficulty threshold or a safety threshold. For example, the difficulty threshold includes a quantitative threshold representative of a number of vehicle scenarios having the difficult attribute that have been used to train the machine learning model 570.

The subset of the plurality of vehicle scenarios may be inputted to the machine learning model 570. In some embodiments, the scenario mining controller 590 may obtain the untested scenario 552 from the scenario database 530 for inputting into the machine learning model 570 and for training the machine learning model 570. The machine learning model 570 may be configured to make the planned movements for the autonomous vehicle and may be an online perception model or an offline perception model. The machine learning model 570 can be implemented by perception system 402, planning system 404, localization system 406, and/or control system 408.

Figure 6:
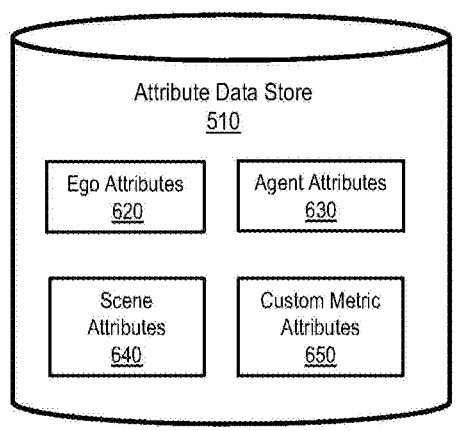
FIG. 6 is a diagram of an implementation of an attribute data store.

Referring now to FIG. 6, illustrated is a diagram of an implementation of an attribute data store 510. The attribute data store 510 may include a set of attributes for identifying an untested scenario 552 in the scenario database 530. The attribute data store 510 may be configured to store attributes related to driving in a vehicle environment. The attribute data store 510 may organize attributes relevant to the vehicle, the environment surrounding the vehicle, or the objects in the environment surrounding the vehicle. For example, the types of attributes includes ego attributes 620, agent attributes 630, scene attributes 640, and custom metric attributes 650.

The attribute data store 510 may include ego attributes 620. Ego attributes 620 may include any features or characteristics of the ego vehicle. For example, the ego attribute is a body style (e.g., a truck, a boat) or a means of powering (e.g., a gasoline-powered vehicle, an electric-powered vehicle). In some embodiments, the ego attribute may be representative of a characteristic of the autonomous vehicle. For example, the ego vehicle has a wheelbase, a track, a height, a speed, a distance between the ego vehicle and the obstacle, and a turning radius. The ego vehicle may have various sensors including LiDAR sensors, radar sensors, microphones, inertial measurement units (IMUs), a GPS receiver, and real-time kinematics (RTK) receivers. Other ego attributes 620 may include Global Navigation Satellite System (GNSS) data, the latitude and longitude of the vehicle, or a state where the vehicle is licensed.

The attribute data store 510 may include agent attributes 630. Agent attributes 630 may include any feature or characteristic capable of movement on its own, such as a proximate vehicle or an agent vehicle. For example, an agent vehicle is a motorcycle, scooters, a waverunner, an 18-wheel semi-truck, a cargo van, a bicycle, and/or the like. The agent attributes 630 may be representative of a characteristic of the agent vehicle. For example, the agent vehicle has a wheelbase, a track, a height, a speed, a distance between the ego vehicle and the obstacle, and a turning radius. The agent attribute may also be an object that moves, such as a pedestrian, a large animal, and a cardboard box blowing in the wind. In some embodiments, the agent attribute may be representative of a moving obstacle proximate to the autonomous vehicle.

The attribute data store 510 may include scene attributes 640. For example, the scene attributes 640 includes road conditions and weather conditions. Road conditions may include an elevation, a hill steepness, a construction zone, a crosswalk, a stoplight, an HOV lane, a median, a traffic speed, a traffic volume, a number of vehicular and cyclist traffic lanes, a lane width, lane traffic directions, lane marker types, or a combination thereof. Weather conditions may include rainy conditions, snowy conditions, fog, and thunderstorms. In some embodiments, a scene attributes 640 may be representative of an environmental obstacle proximate to the autonomous vehicle. Other examples of scene attributes include a parked vehicle, an object in the roadway, an upcoming intersection, traffic conditions, roadway conditions, construction conditions, intersection conditions, pedestrians, an emergency siren, and/or the like.

The attribute data store 510 may include custom metric attributes 650. Custom metric attributes 650 may include any feature or characteristic of the behavior of the ego vehicle. For example, the ego vehicle behaves with a brake tap, a gradual coasting stop, cruise control, and the like. Other custom metric attributes 650 may include headlights on, left turns, right turns, a malfunctioning sensor, a hacked software, pixel noise at the camera, a false tracked object. These behaviors of the ego vehicle may be added to further determine how the machine learning model 570 responds.

The attribute data store 510 may be configured to pass a set of attributes to a search string generator 515. In some embodiments, the attributes in the attribute data store 510 may be selected to obtain untested, rare, or edge-case vehicle scenarios. The untested, rare, or edge-case vehicle scenarios may be desirable to identify to further train the machine learning model 570. For example, a desired scenario that may remain untested by the machine learning model 570 includes an ego vehicle that is driving proximate to a large truck as the ego vehicle and the large truck approach a crosswalk with a pedestrian and a stroller. To capture vehicle scenarios matching or similar to the this desired scenario, the attributes selected from the attribute data store 510 may include a large truck as an agent vehicle, a pedestrian detected in the crosswalk, a stroller detected in the crosswalk, and the ego vehicle is 30 feet away from the crosswalk. In another example, a desired scenario untested by the machine learning model 570 includes an ego vehicle that encounters large animals on country roads at night time. To obtain this desired scenario, the scenario mining controller 590 may select attributes for a desired scenario that includes a night attribute, a single-lane highway attribute, and an animal attribute.

Figure 7:
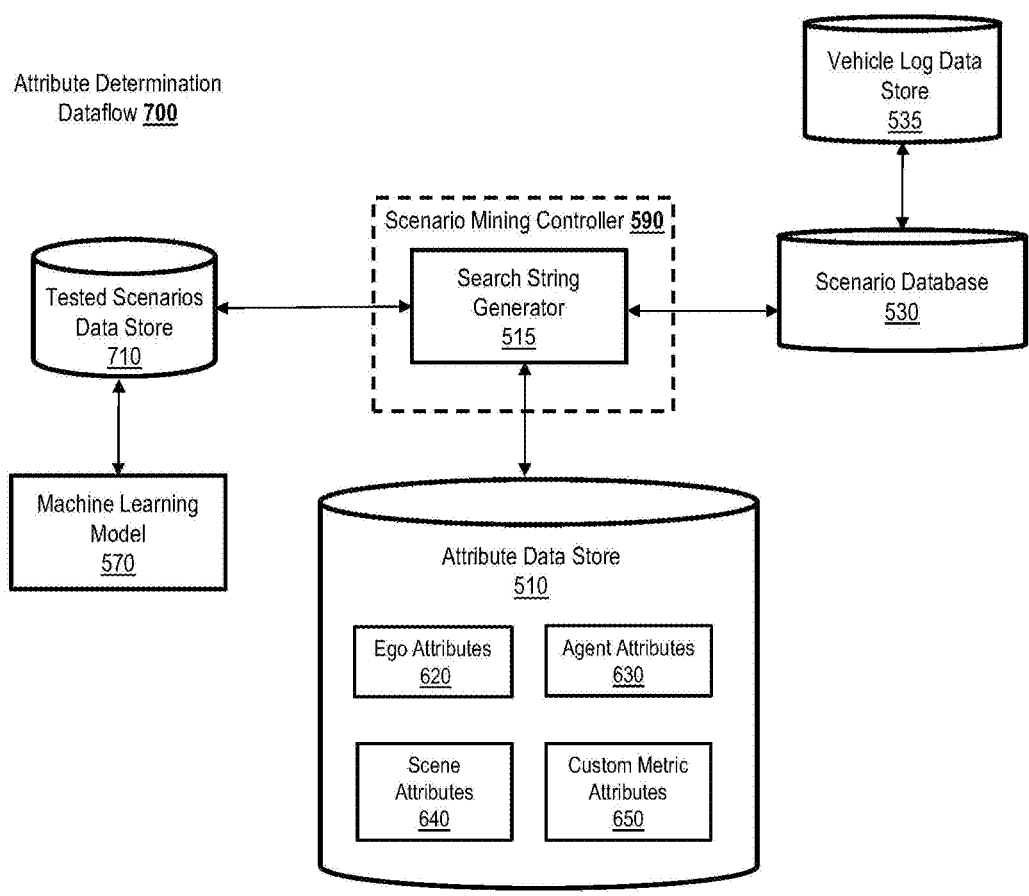
FIG. 7 is a diagram of an implementation of a process for determining a set of attributes to present to a scenario database.

Referring now to FIG. 7, illustrated is a diagram of an implementation of a process for determining a set of attributes to present to a scenario database 530. Determining a specific set of attributes in the attribute determination dataflow 700 can help identify uncommon scenarios potentially encountered by a vehicle. The set of attributes may be selected by examining the training history of the machine learning model 570. The training history of the machine learning model 570 may be stored in the tested scenarios data store 710. The tested scenarios data store 710 may include the scenarios used to test the machine learning model 570. The tested scenarios data store 710 may be queried to determine whether a set of attributes is to return an untested, rare, or edge-case vehicle scenario. Typically, an untested, rare, or edge-case vehicle scenario may exist where the machine learning model 570 has little exposure to an environment having the attribute or a specific combination of attributes. Various methods may be presented herein for determining when a machine learning model 570 has little exposure to an attribute.

The set of attributes may be determined by a frequency at which the attribute or the combination of attributes has been tested by the machine learning model 570 or the test history is recorded in the tested scenarios data store 710. The scenario mining controller 590 may determine whether a potential attribute should be tested by evaluating the frequencies at which each potential attribute or combination of potential attributes has been tested by the machine learning model 570 or the test history is recorded in the tested scenarios data store 710. The scenario mining controller 590 may compare the test frequencies of two or more potential attributes to assist in identifying the untested, rare, and edge-case scenarios. The attributes with the lower test frequency may be selected to identify the untested, rare, and edge-case scenarios.

In comparing the two or more potential attributes, the scenario mining controller 590 may determine a first test frequency for which the machine learning model 570 has made the planned movements for the autonomous vehicle based on a first potential attribute. For example, the scenario mining controller 590 determines the number of times (i.e., first test frequency) the planning system 404 has been presented with an unprotected right-hand turn (i.e., the first potential attribute). The scenario mining controller 590 may determine a second test frequency for which the machine learning model 570 has made the planned movements for the autonomous vehicle based on a second potential attribute. For example, the scenario mining controller 590 determines the number of times (i.e., second test frequency) the planning system 404 has been presented with an unprotected left-hand turn (i.e., the second potential attribute). The scenario mining controller 590 may determine the second test frequency is lower than the first test frequency and select the second potential attribute to add to the set of attributes based on the second test frequency being lower than the first test frequency.

In some other embodiments, the scenario mining controller 590 may determine a test frequency threshold representative of the minimum number of times an attribute is to be exposed to the machine learning model 570 in order to be fully trained. The scenario mining controller 590 may search through the potential attributes and determine that a second attribute fails to satisfy a test frequency threshold and that a first potential attribute satisfies the test frequency threshold. In response to the second attribute failing to satisfy the test frequency threshold, the scenario mining controller 590 may select the second potential attribute as the attribute to be used to search for an untested, rare, or edge-case scenario.

The set of attributes may be determined by a difficulty level associated with the potential attribute or the combination of potential attributes. The difficulty rating may be representative of the amount of information and computations needed to complete the planned movement safely. The scenario mining controller 590 may determine whether a potential attribute should be tested by evaluating the difficulty rating of the potential attribute or the combination of potential attributes. The scenario mining controller 590 may determine whether combining a potential attribute with another potential attribute increases or decreases the difficulty rating associated with the combination of attributes. The scenario mining controller 590 may compare the difficulties of two or more potential attributes to assist in identifying the untested, rare, and edge-case scenarios. The attributes with the higher difficulty rating may be selected to identify the untested, rare, and edge-case scenarios. In some embodiments, the difficulty rating may be affected by a safety threshold or rating of a vehicle maneuver or environment.

In comparing the two or more potential attributes, the scenario mining controller 590 may determine a first difficulty rating for the machine learning model 570 to make the planned movements for the autonomous vehicle based on a first potential attribute. For example, the scenario mining controller 590 determines the difficulty rating based on the first potential attribute that is representative of the information and computations necessary for the machine learning model 570 to navigate the vehicle through an unprotected right-hand turn. The scenario mining controller 590 determines a second difficulty rating for the machine learning model 570 to make the planned movements for the autonomous vehicle based on a second potential attribute. For example, the scenario mining controller 590 determines the difficulty rating based on the second potential attribute that is representative of the information and computations necessary for the machine learning model 570 to instruct the vehicle to make an unprotected left-hand turn. The scenario mining controller 590 determines the second difficulty rating is greater than the first difficulty rating and select the second potential attribute (e.g., navigating an unprotected left-hand turn) to add to the set of attributes based on the second difficulty being greater than the first difficulty.

Figure 8A:
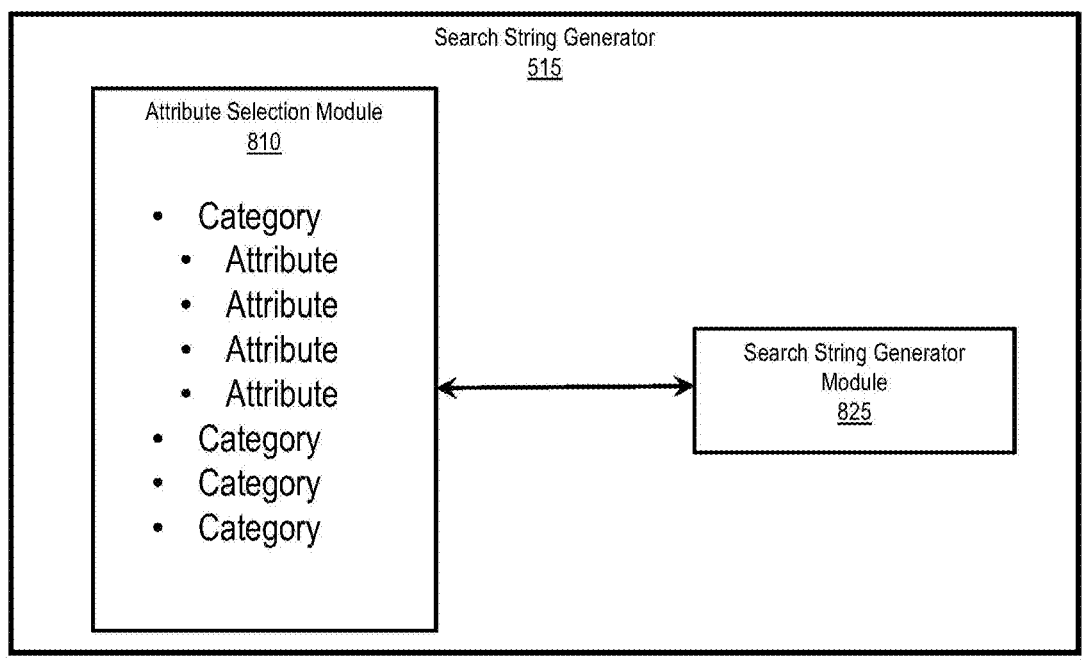
FIG. 8A is a diagram of an implementation of a user interface for generating a search string for querying the scenario database.

Referring now to FIG. 8A, illustrated is a diagram of an implementation of a user interface for generating a search string for querying the scenario database 530. The user interface may be representative of how the attributes are organized and how the search string may be generated. Selecting an attribute set and generating the search string may enable the scenario mining controller 590 to search through the scenario database 530 without a human manually searching through the scenario database 530.

The attribute selection module 810 may present a set of categories representative of attributes having a characteristic of the category. For example, a set of categories includes ego-level attributes, agent-level attributes, scenario-level attributes, custom metrics attributes, and ML model attributes. Within a category, such as the ego-level attributes category, attributes may share a common feature or descriptor. For example, the ego-level attributes category includes an ego vehicle speed, a turning radius, a distance between the ego vehicle and an obstacle, a wheelbase, a track, a height, and a maximum deceleration. The set of categories may expand to reveal a list of attributes that share a common characteristic. For example, a category is selected and a drop-down menu is generated including a list of corresponding attributes sharing a similar characteristic with the category. An attribute may be selected from the attribute selection module 810 for generating a search string configured to identify vehicle scenarios having the attribute.

The search string generator module 825 may be configured to receive an attribute from the attribute selection module 810 and generate a search string based on the attribute. The search string generator module 825 may be configured to format search string code and obtain proper syntax capable of performing the query. For example, the search string generator module 825 is configured to add Boolean logic and add qualifiers and variables to a function call within the search string. In another example, the search string generator module 825 is configured to obtain variables representative of the function call and determine threshold values indicative of constraints needed in the desired vehicle scenario. The search string generator module 825 may be configured to rearrange query code as needed when attributes are added or removed.

In some embodiments, the search string generator module 825 may be configured to generate SQL code. For example, the search string generator module 825 generates the following example SQL query "SELECT log_name, sample_token, timestamp FROM agent_prod.all WHERE length>7 AND agent_type='CAR' AND is_ahead_of_ego=TRUE AND euclidean_distance_to_ego<30.0." The example search string may be generated in response to adding a "large truck" attribute to the search string generator module 825 that is less than 30 feet in front of the ego vehicle.

Figure 8B:
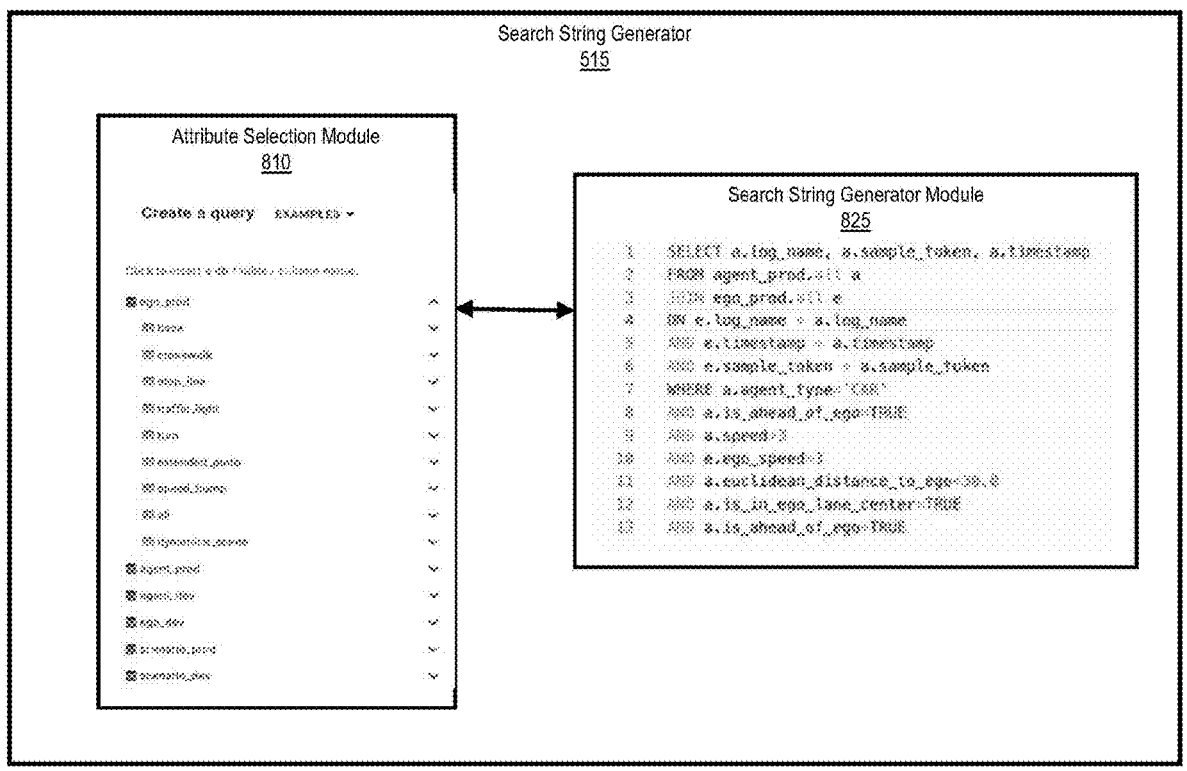
FIG. 8B is a diagram of another implementation of the user interface for generating the search string for querying the scenario database.

Referring now to FIG. 8B, illustrated is a diagram of another implementation of the user interface for generating the search string for querying the scenario database 530. The user interface may include an attribute selection module 810 and a search string generator module 825. The attribute selection module 810 may present a set of categories representative of attributes having the characteristic of the category. The search string generator module 825 may be configured to receive an attribute from the attribute selection module 810 and generate a search string based on the attribute.

Figure 9:
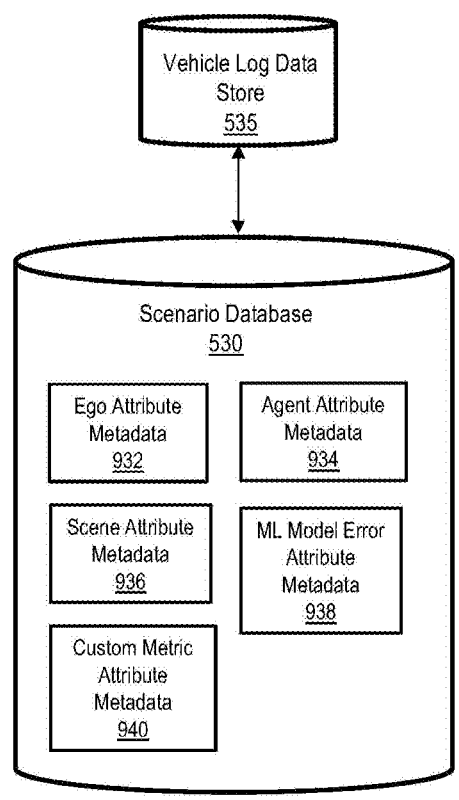
FIG. 9 is a diagram of an implementation of a scenario database.

Referring now to FIG. 9, illustrated is a scenario database 530. A scenario database 530 is searched to identify untested scenario 552 based on the set of attributes. The scenario database 530 includes a plurality of datasets marked with at least one attribute of the set of attributes to facilitate scenario mining. Without the scenario database 530, brute force training and experimentation would be the costly and inefficient alternative for the creation of safe and comprehensive autonomous vehicle machine learning models.

The scenario database 530 may be constructed based on logged driving experiences from the vehicle log data store 535. The scenario database 530 may be configured to label datasets from the vehicle log data store 535 with metadata representative of the features or behaviors in the dataset. The labeled datasets from the vehicle log data store 535 may be stored in the scenario database 530 as a vehicle scenario. The vehicle scenarios may be organized into framesets that includes a plurality of frames that have a discrete timestamp and metadata attached.

The vehicle scenarios in the scenario database 530 may include datasets with metadata. The datasets may include data from the autonomous vehicle sensor system that is representative of an environment surrounding the autonomous vehicle. The autonomous vehicle sensor system may include a LIDAR sensor dataset, camera sensor dataset, RADAR sensor dataset, telemetrics sensor dataset, and other ego vehicle sensor datasets. In some embodiments, the sensor data may be simulated. The metadata labels attached to the vehicle scenarios may include ego attribute metadata 932, agent attribute metadata 934, the scene attribute metadata 936, machine learning model 570 error metadata, and custom metric metadata.

The ego attribute metadata 932 may be added to a dataset including data from the autonomous vehicle sensor system. The ego attribute metadata 932 may include the presence of a sensor in the metadata and a value representative of data gathered by the sensor related to the ego vehicle. For example, the ego attribute metadata 932 includes metadata indicating that the vehicle has a speed sensor and a value in the metadata representative of the speed of a vehicle within a particular frame or frameset. The ego attribute metadata 932 may be added or removed between different framesets. For example, the ego attribute metadata 932 for the speed sensor is not attached to the framesets in which the vehicle is idle. In another example, braking sensor metadata and a metadata value indicative of a rate at which the vehicle is decelerating are added to framesets in which the vehicle is braking.

The agent attribute metadata 934 may be added to a dataset including data from the autonomous vehicle sensor system. The agent attribute metadata 934 may include the presence of a sensor in the metadata and a value representative of data gathered by the sensor related to moving objects around the vehicle. For example, the agent attribute metadata 934 includes metadata indicating that a tractor is approaching in the opposite direction over an overpass within a particular frameset. The agent attribute metadata 934 may be added or removed between different framesets. For example, the agent attribute metadata 934 recognizing the tractor is not attached to the framesets once the tractor has passed the ego vehicle. In another example, the "large animal" metadata and a metadata value indicative of a rate at which the detected large animal is moving is added to the framesets in which a large animal is detected.

The scene attribute metadata 936 may be added to a dataset including data from the autonomous vehicle sensor system. The scene attribute metadata 936 may include the presence of a feature in the environment surrounding the ego vehicle and a value representative of the intensity of the feature in the environment surrounding the ego vehicle. For example, the scene attribute metadata 936 includes metadata indicating that the ego vehicle is approaching a steep hill having a guardrail and a dropoff on one side and that the hill has a specific gradient (i.e., a value representative of the intensity of the feature in the environment). The scene attribute metadata 936 may be added or removed between different framesets. For example, the scene attribute metadata 936 recognizing the steep hill is not attached to the framesets once the ego vehicle has passed the steep hill. In another example, the "snow" metadata and a metadata indicative of the rate of snowfall is added to the framesets when it is snowing.

The machine learning error attribute metadata 938 may be added to a dataset in which there is a difference between the planned movement and the actual movement of the vehicle. The machine learning error attribute metadata 938 may include the presence of a prediction error from the machine learning model 570 and a value representative of the intensity of the error of the machine learning model 570. For example, the machine learning error attribute metadata 938 includes metadata indicating that the machine learning model 570 originally miscalculated the turning radius needed to make a left-hand turn and the difference between the calculated turning radius and the corrected turning radius. The machine learning error attribute metadata 938 may be added or removed between different framesets. For example, the machine learning error attribute metadata 938 may not be attached to framesets including a U-turn in which no difference between the planned U-turn movement and the actual U-turn movement of vehicle. In another example, the "overtake" metadata and a metadata indicative of the error in overtaking a slower vehicle on the highway is added to the framesets in a vehicle scenario where the ego vehicle overtakes a vehicle on the highway. In some embodiments, the machine learning model 570 error may be simulated.

The custom metric attribute metadata 940 may be added to a dataset including data having a particular function, feature, or characteristic of the behavior of the ego vehicle. For example, the function or behavior of the ego vehicle includes a brake tap, a gradual coasting stop, and a cruise control. The custom metric attribute metadata 940 may include the presence of a behavior or function of the ego vehicle and a value representative of the intensity or duration of the feature of the ego vehicle. For example, the custom metric attribute metadata 940 includes metadata indicating that the ego vehicle is in cruise control mode and a duration of the cruise control mode. The custom metric attribute metadata 940 may be added or removed between different framesets. For example, the custom metric attribute metadata 940 indicating a coasted stop is not attached to the framesets once the ego vehicle has coasted to a complete stop. In another example, the "brake tap" metadata and a metadata indicative of the force the user applies the brake during a planned movement of the autonomous vehicle is added to the framesets during a time period before and after the brake tap. In some embodiments, the behaviors or features of the custom metric attribute metadata 940 may be simulated.

Figure 10:
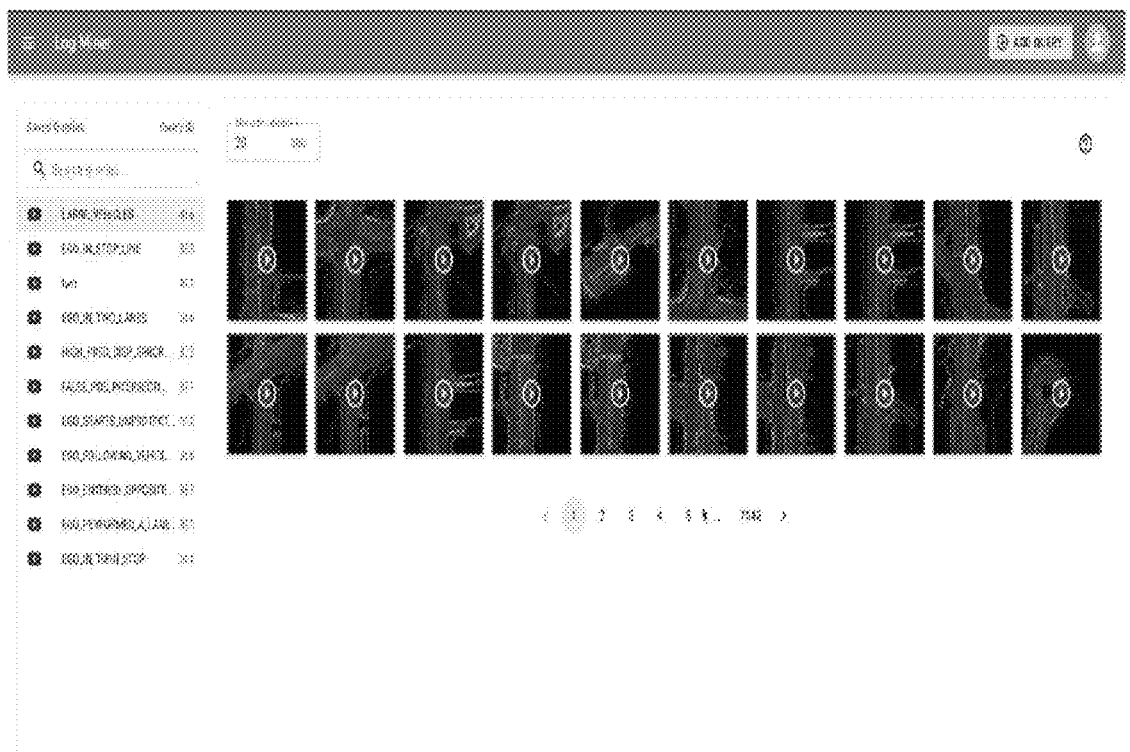
FIG. 10 is a diagram of an example of a user interface for the matching simulations data store.

Referring now to FIG. 10, illustrated is a diagram of an example of a user interface for the matching simulations data store 550. The untested scenario 552 from the scenario database 530 may then obtained for inputting into the machine learning model 570 for training the machine learning model 570 on the edge-case or untested scenario 552. This technique may identify untested scenarios to determine how the vehicle's systems would handle such scenarios in the real world. The untested scenario 552 may be indicative of a scenario in which the planned movements of the machine learning model 570 are uncertain. Without identifying untested scenarios and their associated metrics, it may be unclear the extent of the effect that any one of these uncommon scenarios would have on the autonomous vehicle's ability to continue navigation.

The scenarios obtained from the scenario database 530 may be stored in the matching simulations data store 550. The matching simulations data store 550 may include the obtained scenarios having the queried attribute. For example, the matching simulations data store 550 includes the obtained vehicle scenarios based on the queried attribute "large animal" or obtained vehicle scenarios based on the combination of queried attributes of "stroller," "crosswalk," "intersection," and "30 feet from ego vehicle." The different sets of returned vehicle scenarios may be organized into categories that are displayed in a drop-down menu at the user interface for the matching simulations data store 550.

In some embodiments, the vehicle scenarios obtained from the database may be a dataset from a plurality of frames. Each frame of the plurality of frames has a time stamp at a discrete-time interval and attribute metadata. The attribute metadata may be based on the data received from the autonomous vehicle sensor system corresponding to the time stamp. In some embodiments, the scenario mining controller 590 may obtain the plurality of frames having the attribute metadata associated with the at least one attribute of the set of attributes. In some embodiments, each frame of the vehicle scenario may be marked with the at least one attribute of the set of attributes.

Figure 11:
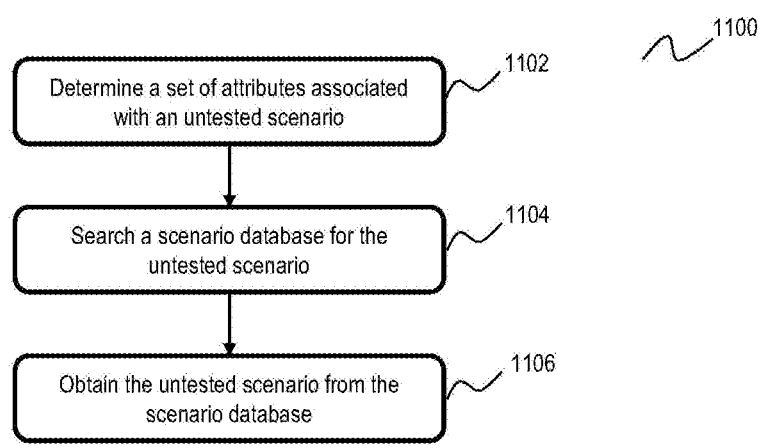
FIG. 11 is a flowchart of a process for a vehicle scenario mining for machine learning models.

Referring now to FIG. 11, illustrated is a flowchart of a process 1100 for vehicle scenario mining for machine learning models. In some embodiments, one or more of the steps described with respect to process 1100 are performed (e.g., completely, partially, and/or the like) by the vehicle scenario mining dataflow. Additionally, or alternatively, in some embodiments, one or more steps described with respect to process 1100 are performed (e.g., completely, partially, and/or the like) by another device or group of devices separate from or including the vehicle scenario mining dataflow.

At 1102, a set of attributes is determined associated with an untested scenario 552 for which a machine learning model 570 of an autonomous vehicle is to make planned movements. For example, the set of attributes includes an agent vehicle that is a large truck, a pedestrian that is detected in a crosswalk in a construction zone, and a distance between the agent and the ego vehicle in order to obtain an untested scenario 552 in which the ego vehicle is approaching a pedestrian in a crosswalk in a construction zone near a large truck.

At 1104, a scenario database 530 is searched for the untested scenario 552 based on the set of attributes. The scenario database 530 includes a plurality of datasets representative of data received from an autonomous vehicle sensor system in which the plurality of datasets is marked with at least one attribute of the set of attributes. For example, a database configured for scenario mining searches through metadata associated with datasets from an autonomous vehicle sensor system in which the metadata has an attribute of the untested scenario 552 of an ego vehicle approaching a pedestrian in a crosswalk in a construction zone near a large truck.

At 1106, the untested scenario 552 is obtained from the scenario database 530 for inputting into the machine learning model 570 for training the machine learning model 570. The machine learning model 570 may be configured to make the planned movements for the autonomous vehicle. For example, the obtained untested scenario 552 of an ego vehicle approaching a pedestrian in a crosswalk in a construction zone near a large truck is presented to an offline machine learning model for further training of the offline machine learning model.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   determining, using at least one processor, a set of attributes associated with an untested scenario for which untested planned movements are uncertain and have not yet been generated by a machine learning model of a vehicle;
   performing, using the at least one processor, a query at a scenario database based on the set of attributes associated with the untested scenario, the scenario database including a plurality of labeled vehicle sensor datasets representative of labeled vehicle sensor data received from a vehicle sensor system, the plurality of labeled vehicle sensor datasets having a subset of the labeled vehicle sensor datasets labeled with at least one attribute of the set of attributes, the set of attributes being indicative of the untested scenario in which the untested planned movements of the machine learning model are uncertain;
   identifying, using the at least one processor and based on the query, the untested scenario at the scenario database from the plurality of labeled vehicle sensor datasets; and
   obtaining, using the at least one processor, the untested scenario from the scenario database for inputting into the machine learning model for training the machine learning model, the machine learning model configured to generate the untested planned movements for the autonomous vehicle.

2. The method of claim 1, further comprising:
   constructing, using the at least one processor and in response to determining the set of attributes associated with the untested scenario, a search string based on the set of attributes, the search string configured to perform the query at the scenario database and identify the untested scenario having the at least one attribute of the set of attributes.

3. The method of claim 1, wherein the scenario database comprises an SQL database, wherein the query comprises an SQL query, and wherein the scenario database is configured to carry out the SQL query.

4. The method of claim 1, wherein determining the set of attributes associated with the untested scenario that the autonomous vehicle is to navigate further comprises:
   determining, using the at least one processor, a first potential attribute frequency based on a first number of tested planned movements including a first potential attribute, the tested planned movements generated by the machine learning model for the vehicle;
   determining, using the at least one processor, a second potential attribute frequency based on a second number of tested planned movements including a second potential attribute, the tested planned movements generated by the machine learning model for the vehicle;

determining, using the at least one processor, the second potential attribute frequency is lower than the first potential attribute frequency;

selecting, using the at least one processor, the second potential attribute to add to the set of attributes based on the second potential attribute frequency being lower than the first potential attribute frequency; and adding, using the at least one processor, the second potential attribute to the set of attributes associated with the untested scenario for which the untested planned movements are uncertain and have not yet been generated by the machine learning model of the vehicle, wherein the subset of the labeled vehicle sensor datasets is labeled with the second potential attribute of the set of attributes.

5. The method of claim 1, wherein determining the set of attributes associated with the untested scenario that the autonomous vehicle is to navigate further comprises:

determining, by the one or more processors, a first potential attribute difficulty for the machine learning model to generate the planned movements in response to scenarios having a first potential attribute;

determining, using the at least one processor, a second potential attribute difficulty for the machine learning model to generate the planned movements in response to scenarios having a second potential attribute;

determining, using the at least one processor, the second potential attribute difficulty is greater than the first potential attribute difficulty;

selecting, using the at least one processor, the second potential attribute to add to the set of attributes based on the second potential attribute difficulty being greater than the first potential attribute difficulty; and adding, using the least one processor, the second potential attribute to the set of attributes associated with the untested scenario for which the untested planned movements are uncertain and have not yet been generated by the machine learning model of the vehicle, wherein the subset of labeled vehicle sensor datasets is labeled with the second potential attribute of the set of attributes.

6. The method of claim 1, further comprising:

presenting, using the at least one processor, the untested scenario to the machine learning model for training the machine learning model, the machine learning model configured to generate the planned movements for the autonomous vehicle, wherein the machine learning model was previously trained with at least one vehicle sensor dataset of the labeled vehicle sensor datasets and wherein the machine learning model has not yet generated planned movements in response to the untested scenario having the set of attributes.

7. The method of claim 1, wherein the at least one attribute includes at least one of an agent-level attribute representative of a moving obstacle proximate to the autonomous vehicle, a scene-level attribute representative of environmental obstacle proximate to the autonomous vehicle, and an ego-level attribute representative of a characteristic of the autonomous vehicle, and wherein the agent-level attribute is selected from at least one of a large truck, a motorcycle, a scooter, a class 1-8 vehicle, a cargo van, a bicycle, a large animal, or a pedestrian, wherein the scene-level attribute is selected from at least one of an elevation, a hill steepness, a construction zone, a crosswalk, a stoplight, an HOV lane, a median, a traffic speed, a traffic volume, a number of vehicular and cyclist traffic lanes, a lane width, lane traffic directions, lane marker types, rainy conditions, snowy conditions, fog, and thunderstorms, a parked vehicle, an object in a roadway, an upcoming intersection, traffic conditions, roadway conditions, construction conditions, intersection conditions, pedestrians, or an emergency siren, and wherein the ego-level attribute is selected from a presence of a sensor in the plurality of labeled vehicle sensor datasets or a value representative of data gathered by the sensor in the plurality of labeled vehicle sensor datasets.

8. The method of claim 1, wherein the plurality of labeled vehicle sensor datasets are organized into a plurality of frames, wherein each frame of the plurality of frames has a time stamp and labeled attribute metadata, the labeled attribute metadata based on the labeled vehicle sensor data received from the vehicle sensor system corresponding to the time stamp.

9. The method of claim 8, wherein obtaining the untested scenario further comprises:

obtaining, using the at least one processor, the plurality of frames having the labeled attribute metadata associated with the at least one attribute of the set of attributes.

10. The method of claim 1, wherein the labeled vehicle sensor data received from the vehicle sensor system includes labeled vehicle sensor data related to an environment of the vehicle, and wherein each labeled vehicle sensor dataset of the plurality of labeled vehicle sensor datasets is marked with the at least one attribute of the set of attributes, wherein the vehicle sensor system includes at least one of a LiDAR sensor, a camera sensor, a RADAR sensor, or a telemetrics sensor, and wherein the plurality of labeled vehicle sensor datasets includes at least one of a labeled LiDAR sensor dataset, a labeled RADAR sensor dataset, a telemetrics sensor dataset.

11. A system comprising:

at least one processor, and at least one non-transitory storage media storing instructions that, when executed by the at least one processor, cause the at least one processor to perform operations comprising:

determining, using the at least one processor, a set of attributes associated with an untested scenario for which untested planned movements are uncertain and have not yet been generated by a machine learning model of a vehicle;

performing, using the at least one processor, a query at a scenario database based on the set of attributes associated with the untested scenario, the scenario database including a plurality of labeled vehicle sensor datasets representative of labeled vehicle sensor data received from a vehicle sensor system, the plurality of labeled vehicle sensor datasets having a subset of the labeled vehicle sensor datasets labeled with at least one attribute of the set of attributes, the set of attributes being indicative of the untested scenario in which the untested planned movements of the machine learning model are uncertain;

identifying, using the at least one processor and based on the query, the untested scenario at the scenario database from the plurality of labeled vehicle sensor datasets; and obtaining, using the at least one processor, the untested scenario from the scenario database for inputting into the machine learning model for training the machine learning model, the machine learning model configured to generate the untested planned movements for the autonomous vehicle.

12. The system of claim 11, further comprising:
constructing, using the at least one processor and in response to determining the set of attributes associated with the untested scenario, a search string based on the set of attributes, the search string configured to perform the query at the scenario database and identify the untested scenario having the at least one attribute of the set of attributes.

13. The system of claim 11, wherein the scenario database comprises an SQL database, wherein the query comprises an SQL query, and wherein the scenario database is configured to carry out the SQL query.

14. The system of claim 11, wherein determining the set of attributes associated with the untested scenario that the autonomous vehicle is to navigate further comprises:
determining, using the at least one processor, a first potential attribute frequency based on a first number of tested planned movements including a first potential attribute, the tested planned movements generated by the machine learning model for the vehicle;
determining, using the at least one processor, a second potential attribute frequency based on a second number of tested planned movements including a second potential attribute, the tested planned movements generated by the machine learning model for the vehicle;
determining, using the at least one processor, the second potential attribute frequency is lower than the first potential attribute frequency;
selecting, using the at least one processor, the second potential attribute to add to the set of attributes based on the second potential attribute frequency being lower than the first potential attribute frequency; and
adding, using the least one processor, the second potential attribute to the set of attributes associated with the untested scenario for which the untested planned movements are uncertain and have not yet been generated by the machine learning model of the vehicle,
wherein the subset of labeled vehicle sensor datasets is labeled with the second potential attribute of the set of attributes.

15. The system of claim 11, wherein determining the set of attributes associated with the untested scenario that the autonomous vehicle is to navigate further comprises:
determining, by the one or more processors, a first potential attribute difficulty for the machine learning model to generate the planned movements in response to scenarios having a first potential attribute;
determining, using the at least one processor, a second potential attribute difficulty for the machine learning model to generate the planned movements in response to scenarios having a second potential attribute;
determining, using the at least one processor, the second potential attribute difficulty is greater than the first potential attribute difficulty;
selecting, using the at least one processor, the second potential attribute to add to the set of attributes based on the second potential attribute difficulty being greater than the first potential attribute difficulty; and
adding, using the least one processor, the second potential attribute to the set of attributes associated with the untested scenario for which the untested planned movements are uncertain and have not yet been generated by the machine learning model of the vehicle,
wherein the subset of labeled vehicle sensor datasets is labeled with the second potential attribute of the set of attributes.

16. The system of claim 11, further comprising:
presenting, using the at least one processor, the untested scenario to the machine learning model for training the machine learning model, the machine learning model configured to generate the planned movements for the autonomous vehicle,
wherein the machine learning model was previously trained with at least one vehicle sensor dataset of the labeled vehicle sensor datasets and wherein the machine learning model has not yet generated planned movements in response to the untested scenario having the set of attributes.

17. The system of claim 11, wherein the at least one attribute includes at least one of an agent-level attribute representative of a moving obstacle proximate to the autonomous vehicle, a scene-level attribute representative of environmental obstacle proximate to the autonomous vehicle, and an ego-level attribute representative of a characteristic of the autonomous vehicle, and
wherein the agent-level attribute is selected from at least one of a large truck, a motorcycle, a scooter, a class 1-8 vehicle, a cargo van, a bicycle, a large animal, or a pedestrian,
wherein the scene-level attribute is selected from at least one of an elevation, a hill steepness, a construction zone, a crosswalk, a stoplight, an HOV lane, a median, a traffic speed, a traffic volume, a number of vehicular and cyclist traffic lanes, a lane width, lane traffic directions, lane marker types, rainy conditions, snowy conditions, fog, and thunderstorms, a parked vehicle, an object in a roadway, an upcoming intersection, traffic conditions, roadway conditions, construction conditions, intersection conditions, pedestrians, or an emergency siren, and
wherein the ego-level attribute is selected from a presence of a sensor in the plurality of labeled vehicle sensor datasets or a value representative of data gathered by the sensor in the plurality of labeled vehicle sensor datasets.

18. The system of claim 11, wherein the plurality of labeled vehicle sensor datasets are organized into a plurality of frames, wherein each frame of the plurality of frames has a time stamp and labeled attribute metadata, the labeled attribute metadata based on the labeled vehicle sensor data received from the vehicle sensor system corresponding to the time stamp.

19. The system of claim 18, wherein obtaining the untested scenario further comprises:
obtaining, using the at least one processor, the plurality of frames having the labeled attribute metadata associated with the at least one attribute of the set of attributes.

20. The system of claim 11, wherein the labeled vehicle sensor data received from the vehicle sensor system includes labeled vehicle sensor data related to an environment of the vehicle, and wherein each labeled vehicle sensor dataset of the plurality of labeled vehicle sensor datasets is marked with the at least one attribute of the set of attributes,
wherein the vehicle sensor system includes at least one of a LiDAR sensor, a camera sensor, a RADAR sensor, or a telemetrics sensor, and
wherein the plurality of labeled vehicle sensor datasets includes at least one of a labeled LiDAR sensor dataset, a labeled RADAR sensor dataset, a telemetrics sensor dataset.

21. A non-transitory computer-readable storage medium comprising at least one program for execution by one or more processors of a first device, the at least one program including instructions which, when executed by the one or more processors, cause the first device to perform operations comprising:
- determining, using at least one processor, a set of attributes associated with an untested scenario for which untested planned movements are uncertain and have not yet been generated by a machine learning model of a vehicle;
- performing, using the at least one processor, a query at a scenario database based on the set of attributes associated with the untested scenario, the scenario database including a plurality of labeled vehicle sensor datasets representative of labeled vehicle sensor data received from a vehicle sensor system, the plurality of labeled vehicle sensor datasets having a subset of the labeled vehicle sensor datasets labeled with at least one attribute of the set of attributes, the set of attributes being indicative of the untested scenario in which the untested planned movements of the machine learning model are uncertain;
- identifying, using the at least one processor and based on the query, the untested scenario at the scenario database from the plurality of labeled vehicle sensor datasets; and
- obtaining, using the at least one processor, the untested scenario from the scenario database for inputting into the machine learning model for training the machine learning model, the machine learning model configured to generate the untested planned movements for the autonomous vehicle.

22. The non-transitory computer-readable storage medium of claim 21, further comprising:
- constructing, using the at least one processor and in response to determining the set of attributes associated with the untested scenario, a search string based on the set of attributes, the search string configured to perform the query at the scenario database and identify the untested scenario having the at least one attribute of the set of attributes.

23. The non-transitory computer-readable storage medium of claim 21, wherein the scenario database comprises an SQL database, wherein the query comprises an SQL query, and wherein the scenario database is configured to carry out the SQL query.

24. The non-transitory computer-readable storage medium of claim 21, wherein determining the set of attributes associated with the untested scenario that the autonomous vehicle is to navigate further comprises:
- determining, using the at least one processor, a first potential attribute frequency based on a first number of tested planned movements including a first potential attribute, the tested planned movements generated by the machine learning model for the vehicle;
- determining, using the at least one processor, a second potential attribute frequency based on a second number of tested planned movements including a second potential attribute, the tested planned movements generated by the machine learning model for the vehicle;
- determining, using the at least one processor, the second potential attribute frequency is lower than the first potential attribute frequency;
- selecting, using the at least one processor, the second potential attribute to add to the set of attributes based on the second potential attribute frequency being lower than the first potential attribute frequency; and
- adding, using the least one processor, the second potential attribute to the set of attributes associated with the untested scenario for which the untested planned movements are uncertain and have not yet been generated by the machine learning model of the vehicle,
- wherein the subset of labeled vehicle sensor datasets is labeled with the second potential attribute of the set of attributes.

25. The non-transitory computer-readable storage medium of claim 21, wherein determining the set of attributes associated with the untested scenario that the autonomous vehicle is to navigate further comprises:
- determining, by the one or more processors, a first potential attribute difficulty for the machine learning model to generate the planned movements in response to scenarios having a first potential attribute;
- determining, using the at least one processor, a second potential attribute difficulty for the machine learning model to generate the planned movements in response to scenarios having a second potential attribute;
- determining, using the at least one processor, the second potential attribute difficulty is greater than the first potential attribute difficulty;
- selecting, using the at least one processor, the second potential attribute to add to the set of attributes based on the second potential attribute difficulty being greater than the first potential attribute difficulty; and
- adding, using the least one processor, the second potential attribute to the set of attributes associated with the untested scenario for which the untested planned movements are uncertain and have not yet been generated by the machine learning model of the vehicle,
- wherein the subset of labeled vehicle sensor datasets is labeled with the second potential attribute of the set of attributes.

26. The non-transitory computer-readable storage medium of claim 21, further comprising:
- presenting, using the at least one processor, the untested scenario to the machine learning model for training the machine learning model, the machine learning model configured to generate the planned movements for the autonomous vehicle,
- wherein the machine learning model was previously trained with at least one vehicle sensor dataset of the labeled vehicle sensor datasets and wherein the machine learning model has not yet generated planned movements in response to the untested scenario having the set of attributes.

27. The non-transitory computer-readable storage medium of claim 21, wherein the at least one attribute includes at least one of an agent-level attribute representative of a moving obstacle proximate to the autonomous vehicle, a scene-level attribute representative of environmental obstacle proximate to the autonomous vehicle, and an ego-level attribute representative of a characteristic of the autonomous vehicle, and
- wherein the agent-level attribute is selected from at least one of a large truck, a motorcycle, a scooter, a class 1-8 vehicle, a cargo van, a bicycle, a large animal, or a pedestrian,
- wherein the scene-level attribute is selected from at least one of an elevation, a hill steepness, a construction zone, a crosswalk, a stoplight, an HOV lane, a median, a traffic speed, a traffic volume, a number of vehicular and cyclist traffic lanes, a lane width, lane traffic directions, lane marker types, rainy conditions, snowy conditions, fog, and thunderstorms, a parked vehicle, an object in a roadway, an upcoming intersection, traffic conditions, roadway conditions, construction conditions, intersection conditions, pedestrians, or an emergency siren, and wherein the ego-level attribute is selected from a presence of a sensor in the plurality of labeled vehicle sensor datasets or a value representative of data gathered by the sensor in the plurality of labeled vehicle sensor datasets.

28. The non-transitory computer-readable storage medium of claim 21, wherein the plurality of labeled vehicle sensor datasets are organized into a plurality of frames, wherein each frame of the plurality of frames has a time stamp and labeled attribute metadata, the labeled attribute metadata based on the labeled vehicle sensor data received from the vehicle sensor system corresponding to the time stamp.

29. The non-transitory computer-readable storage medium of claim 28, wherein obtaining the untested scenario further comprises:

obtaining, using the at least one processor, the plurality of frames having the labeled attribute metadata associated with the at least one attribute of the set of attributes.

30. A method comprising:

performing, using at least one processor, a query at a scenario database for based on a set of attributes associated with an untested scenario, the scenario database including a plurality of labeled vehicle sensor datasets representative of labeled vehicle sensor data received from a vehicle sensor system, the plurality of labeled vehicle sensor datasets having a subset of the labeled vehicle sensor datasets labeled with at least one attribute of the set of attributes, the untested scenario for which untested planned movements are uncertain and have not yet been generated by a machine learning model of a vehicle; and obtaining, using the at least one processor, the untested scenario from the scenario database for inputting into the machine learning model for training the machine learning model, the machine learning model configured to generate the untested planned movements for the autonomous vehicle.

* * * * *